United States Patent

[11] 3,580,460

[72] Inventor Lewis D. Lipschutz
Poughkeepsie, N.Y.

[21] Appl. No. 747,940
[22] Filed July 26, 1968
[45] Patented May 25, 1971
[73] Assignee International Business Machines Corporation Armonk, N.Y.

[54] THERMOCOMPRESSION BONDING APPARATUS
6 Claims, 9 Drawing Figs.

[52] U.S. Cl. .......... 228/4, 29/470.3, 29/471.1, 156/73, 156/580, 228/1, 228/3, 228/49
[51] Int. Cl. .......... B23k 1/00, B23k 37/04
[50] Field of Search .......... 228/1, 3, 49; 29/470.3, 471.1; 156/73, 580; 228/4, 5

[56] References Cited

UNITED STATES PATENTS

| | | | |
|---|---|---|---|
| 3,483,611 | 12/1969 | Balamuth et al. | 228/1X |
| 3,483,066 | 12/1969 | Harris et al. | 228/1X |
| 3,458,102 | 7/1969 | Zanger et al. | 228/3 |
| 3,440,117 | 4/1969 | Soloff et al. | 29/470.3X |
| 3,250,452 | 5/1966 | Angelucci et al. | 228/3 |

*Primary Examiner*—John F. Campbell
*Assistant Examiner*—Robert J. Craig
*Attorneys*—Hanifin & Jancin and Kenneth R. Stevens

ABSTRACT: A thermocompression bonding apparatus having a plurality of slidably disposed, independently operable impact surfaces. A plurality of pistons are slidably disposed in a housing, and each include extension means terminating in respective impact surfaces. The pistons are actuated so as to urge the impact surfaces into an impact zone so as to affect a plurality of thermocompression bonds.

INVENTOR
LEWIS D. LIPSCHUTZ

BY Kenneth R. Stevens
ATTORNEY

THERMOCOMPRESSION BONDING APPARATUS

BACKGROUND OF THE INVENTION

The present invention relates to a bonding apparatus, and more particularly to a bonding apparatus for making thermocompression interconnection bonds between substrate land patterns and semiconductor chip means.

Prior interconnection technology has employed either thermocompression or ultrasonic bonding techniques in which point-to-point wiring is accomplished at an extremely high cost. For example, in making device-to-substrate interconnections, the flying lead approach has proved to be extremely unreliable, because the interconnections are made on a point-to-point basis. Similarly, the beam lead interconnection concept contains many inherent disadvantages, since the interconnection members are extremely fragile and easily breakable when adapted as interconnection members for small semiconductor chips and substrate land patterns.

One approach to eliminating the problem involved with the flying lead or the beam lead technique is the planar approach in which a chip is mounted in a protective substrate cavity such that the surface of the chip is approximately level with or slightly below the substrate surface. With this surface configuration, an inexpensive and reliable method for making interconnections at high speeds between the substrate and the chip is obtainable. This planar approach gives rise to the introduction of decals as an interconnection medium. The decal concept refers to a preformed array of metallic interconnectors which are supported by a transparent film carrier. This arrangement allows multiple interconnection alignment and bonding after which the film carrier is removed, so as to complete the transfer of the metallic interconnection members from the film carrier to the chip-substrate terminals. It can be seen that the decal approach provides high reliability and a great amount of flexibility. That is, the decal may first be bonded to the chip and substrate, and the chip bonded as a last step, or vice versa.

Thus, a thermocompression bonding apparatus for use with the planar interconnection approach which also performs multiple bonds in a reliable manner at high speeds is most desirable. In the past, one approach to making multiple bonds in a microcircuit assembly is the use of a heated sleeve which presses a plurality of terminal straps on an electrical components into engagement with a plurality of respective metal paths on a supporting plate. In other words, a single impact surface is moved into a bonding zone in order to simultaneously affect a plurality of bonds. However, a thermocompression bonding apparatus of this type, among other reasons, is totally unsuited for use with metallic interconnection members having a thickness of approximately 0.5 mils, or with substrate land patterns having a thickness of approximately 0.24 melts and with chip terminal metallurgy having a thickness of approximately 2.5 microns. These dimensions are merely illustrative, but clearly illustrate the close tolerances and attendant problems which would be involved in making a thermocompression interconnection between members having these extremely small dimensions. In addition, the problems involved in making a plurality of thermocompression bonds between spaced members is compounded by the fact that the spacing between adjacent members is sometimes in the range of 0.2 mils. Obviously, a thermocompression bonding apparatus which employs a unitary stamping surface for affecting a plurality of bonds is wholly inadequate, and in fact, is damaging to members having such small dimensions.

It is thus an object of the present invention to simultaneously make a plurality of reliable thermocompression bonds by applying uniform pressure to a plurality of points.

Another object of the present invention is to simultaneously make a plurality of reliable thermocompression bonds in a confined area between separate electrical means, the electrical means having extremely small dimensions, without forming unintended short circuits or damaging the electrical means.

A further object of the present invention is to simultaneously make a plurality of reliable thermocompression bonds at a plurality of points, in a confined area, between separate electrical means having extremely small dimensions by applying uniform pressure to a plurality of bonding points and wherein the points are not necessarily located in the same plane.

SUMMARY OF THE INVENTION

The present invention provides a thermocompression bonding apparatus which includes a housing having a power connection means associated therewith, and an array of impact surface means operatively disposed in the housing, each of the impact surface means being adapted for independent slidable movement to an impact zone. The array of impact surface means are independently operative to form a plurality of reliable thermocompression bonds by applying uniform pressure to a plurality of bonding points.

BRIEF DESCRIPTION OF THE DRAWINGS

The foregoing and other objects, features and advantages of the invention will be apparent from the following more particular description of a preferred embodiment of the invention as illustrated in the accompanying drawings.

In the drawings.

DESCRIPTION OF A PREFERRED EMBODIMENT

Figures 1, 2:
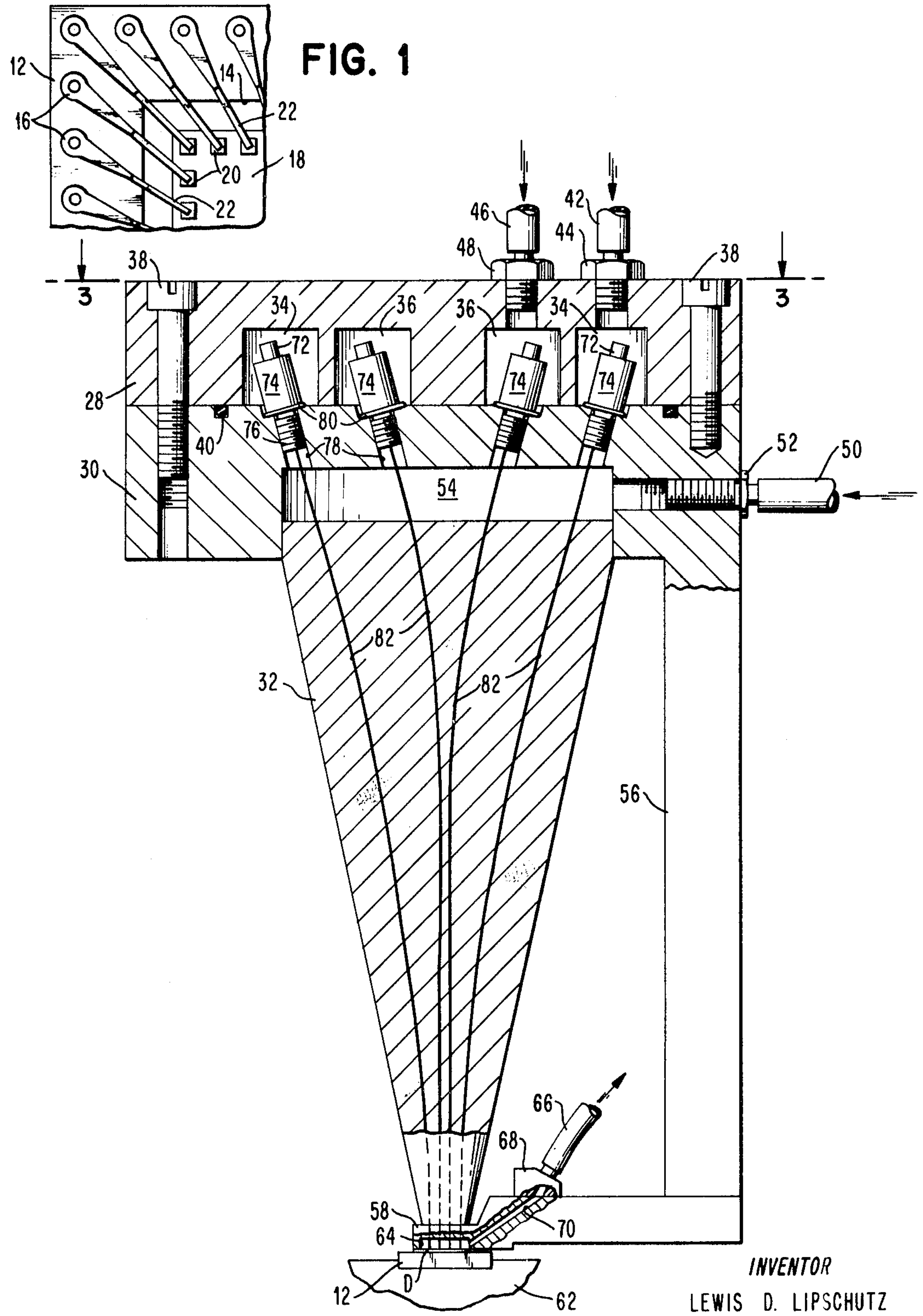
FIG. 1 is an exploded fragmentary plan view illustrating a semiconductor chip positioned in a cavity of a substrate, and the electrical connection between the chip terminals and the respective substrate land patterns via interconnection members.
FIG. 2 is a broken-away sectional, elevated view of the thermocompression bonding apparatus, in addition to a diagrammatic view illustrating a heating substrate carrier, a substrate, and a decal.

Now referring to FIGS. 1 and 2, FIG. 1 illustrates one particular mode of interconnection technology for which the thermocompression bonding apparatus generally shown in FIG. 2 is well suited. A substrate 12 have a cavity 14 formed therein, and also a plurality of metallized land patterns 16 formed on its upper surface. A semiconductor chip 18, having a plurality of terminals 20, is positioned in the cavity 14 and back bonded into the indicated position. The thermocompression bonding apparatus of FIG. 2 operates to interconnect each of the plurality of substrate land patterns 16 to a respective ones of the plurality of chip terminals 20 via respective interconnection members generally shown as 22. It is not unusual for a semiconductor chip to have a thickness of 0.009 mils, and thus it is readily apparent that in order to form high strength and reliable bonds a thermocompression bonding apparatus is required which compensates for tolerance variations. Namely, the thermocompression bonding apparatus must accommodate itself to height differences which may exist by virtue of the fact that the plurality of substrate land patterns 16 and the plurality of chip terminals 20 are not in the same plane.

The thermocompression bonding apparatus to FIG. 2 includes a housing which is formed by an upper cover plate 28, a bottom cover plate 30, and an elongated, molded lower portion 32. An outer chamber 34 and an inner chamber 36 are formed in the upper cover plate 28. By means of a plurality of joining screws 38 and an O-ring 40, the upper cover plate 28 and the lower cover plate 30 are joined together so as to maintain inner and outer chambers air tight.

Power is supplied to the outer chamber 34 and the inner chamber 36 by way of a power connection means. For the outer chamber 34 and the inner chamber 36 by way of a power connection means. For the outer chamber 34, a hose 42 delivers a source of fluid power via an interconnection adapter 44. For the inner chamber 36, a hose 46 delivers power via an interconnection adapter 48. The power connection means also includes a source of return power which is delivered by way of a hose 50 and an interconnection adapter 52 which in turn communicates with a chamber 54.

Also formed as an integral part of the bottom cover plate 30 is a bracket arm 56 which terminates in a lower bracket support platform 58, as later shown in greater detail in FIG. 4. The lower extremity of the elongated molded housing portion 32 rests on the upper surface of the lower bracket support platform 58.

As diagrammatically shown in FIG. 2, the substrate 12 is shown mounted in a heating substrate carrier 62. A decal D is shown held in place at the under surface of the lower bracket support platform 58 in which is formed a recessed cavity 64, and which recessed cavity 64 communicates with a source of vacuum via a vacuum hose 66, adapter 68, and a passage 70.

A plurality of independently operated pistons 72 are slidably disposed in their respective piston housings, generally indicated at 74. The piston housings include respective threaded members 76 which threadably engaged holes 78 formed in the bottom cover plate 30. Associated with each of the piston housing members 74 is an O-ring 80 which provides an inner seal between the return chamber 54 and the outer and inner chambers 34 and 36, respectively.

Figures 3, 4, 9:
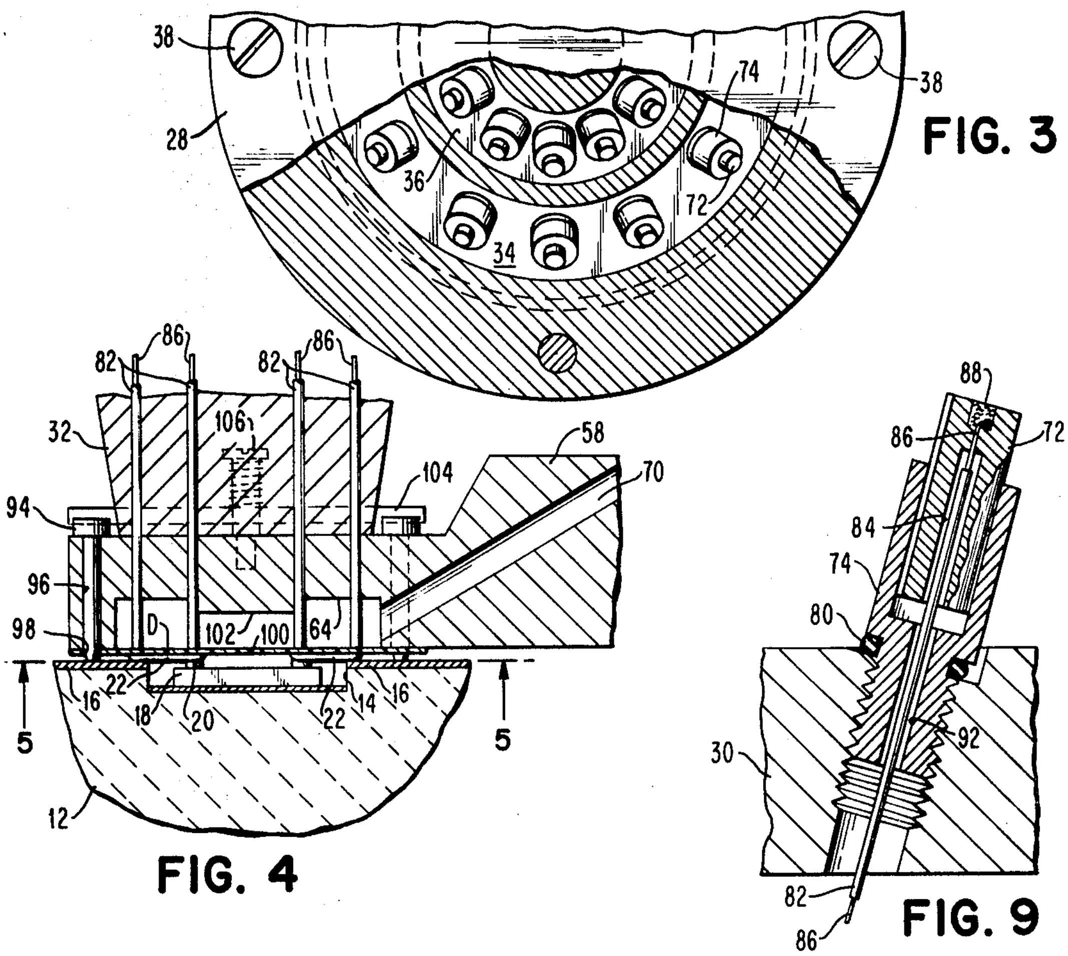
FIG. 3 is a fragmentary plan view, partially broken away, taken along line 3–3 and viewed in the direction of the arrows.
FIG. 4 is an enlarged sectional view illustrating the lower portion of the thermocompression bonding apparatus of FIG. 2, and further illustrating an array of impact surfaces being moved to an impact zone, which impact zone contains heated spaced chip terminals, spaced substrate land patterns, and spaced interconnection members affixed to a carrier film.
FIG. 9 is an exploded, sectional view illustrating the details of a piston assembly, generally shown in FIG. 2.

As generally shown in FIG. 2, and in greater detail in FIG. 9, each of the pistons 72 are slidably disposed in their respective housing 74. Centrally located along the longitudinal axis of each of the piston 74 is an internal bore 84 which receives the upper portion of its respective guide tube 82. Each of the piston heads 72 have an extension or wire means 86 which is rigidly attached by a solder connection indicated generally at 88. The wirelike extension 86 is slidably disposed within respective ones of said guide tube means 82. The lower ends of the respective wires or extension means 86 terminate in what has been designated as an impact surface. Thus, the plurality of impact surfaces, indicated generally at 90 in FIG. 5, form an array which is adapted for independent slidable movement to an impact zone. A passage 92 formed in each of the respective piston housings 74, FIG. 9, communicates with the cavity 54 so as to allow the return source of power to urge the respective piston 72 upwardly subsequent to a bonding operation.

In one fabricated version of the present invention, the wires 82 possess a diameter of approximately 5 mils. Thus, it is apparent that an extremely difficult problem arises in attempting to fabricate the lower elongated portion of the housing 32. That is, it would be practically impossible to mechanically form elongated guide passages in the lower portion 32 such that the impact surface or lower ends of the wires 82 would conform to the desired array which would be necessary to form simultaneously a plurality of thermocompression bonds between a substrate and a chip, as illustrated in FIG. 1.

Although in no way intended to limit the scope of the present invention, one means of obtaining the desired array of impact surfaces will now be described. The entire assembly as shown in FIG. 2, including the guide tubes 82 and their respective wires 86 mounted therein, with the exception of the lower elongated portion 32, is first fabricated. Then, the guide tubes which may be fabricated of any material which will maintain its rigidity after being shaped, are manually arranged for flexed so that their respective impact wires converge to the desired configuration. A preform mold (not shown) is then placed around the plurality of guide means or tubes 82. A moldable material, such as a liquid metal, is then introduced into the preform mold. One method of introducing the liquid metal is to utilize the passageway which is slidably engaged by the adapter 52 connected to the hose 50, and which has already been formed in the lower plate 30. Upon setting, the preform mold is removed so as to leave the guide tubes and their impact wires terminating in an impact surface of the desired array.

Now referring to FIG. 3 which shows a portion of the top or upper cover 28 broken away so as to expose the outer chamber 34, the inner chamber 36, and the plurality of pistons 72 and their respective piston housings 74. In the preferred embodiment of the present invention two chambers are disclosed because a slightly improved mode of operation is obtained by energizing the pistons disposed in the inner chamber at a time slightly prior to energizing the pistons located in the outer chamber. However, it is appreciated that in many applications a single chamber energized by once source of power, hydraulic or pneumatic, is equally suitable.

Now referring to FIG. 4, it shows the lower bracket support platform and the impact zone in greater detail. Like reference numerals are employed to indicate like corresponding elements in the various figures and similarly like reference numerals or letter designations are employed to designate the substrate, the chip, and their various electrical interconnections as originally described with reference to FIG. 1. Thus, in FIG. 4 the substrate 12 including its metallized land patterns 16 the cavity 14 is shown supporting the chip 18 with its associated plurality of terminals 20. The lower bracket support platform 58 includes a plurality of alignment pins 94 which are slidably mounted in a plurality of respective passages 96.

The plurality of alignment pins 94 are employed to obtain proper orientation with respect to the decal D. The alignment pins 94 in conjunction with the plurality of registration holes 98 formed in the decal D, more clearly shown in FIG. 5, insure that the plurality of interconnection members 22 adhesively affixed to a decal film carrier 100 align properly with their respective chip terminal 20 and substrate land pattern 16. As previously described, the undersurface of the lower bracket support platform has a recessed cavity portion 64 formed therein which in turn communicates with the vacuum passage 70 so as to firmly hold the decal film carrier surface 100 in a firm position.

In order to prove added rigidity and alignment for the inner guide tubes 82 the recessed cavity 64 is formed such that a central portion or block 102 extends downwardly a greater distance.

Figure 5:
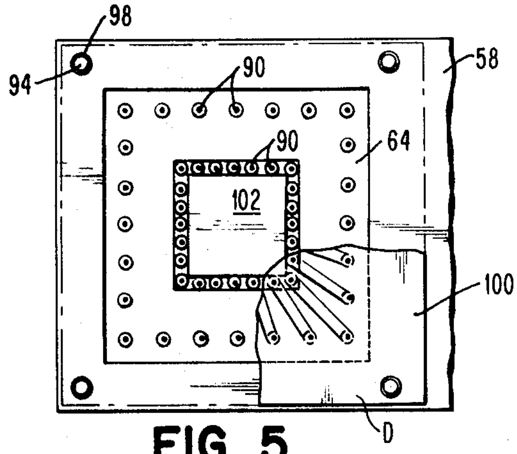
FIG. 5 is a view taken along line 5–5 of FIG. 4 viewed in the direction of the arrows, with the decal carrier film partially broken away to illustrate an array formed by the impact surfaces.

As more clearly shown in FIG. 5, the plurality of impact surface 90 formed by the ends of the plurality of wires 86 provide an array which conforms to the desired plurality of bonding points associated with the particular connection being made.

Figure 6:
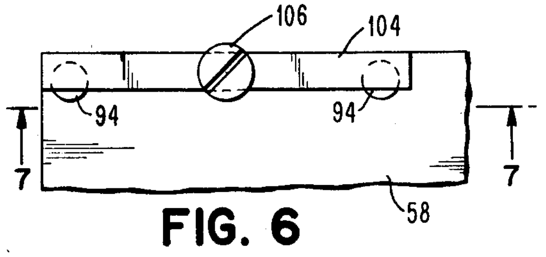
FIG. 6 is a fragmentary plan view of FIG. 4 illustrating a plurality of alignment pins and their associated biasing bar.
Figure 7:
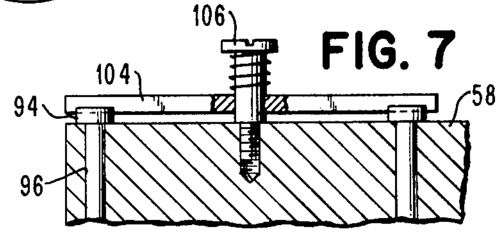
FIG. 7 is a view taken along line 7–7 of FIG. 6.

In one specific mode of operation, the decal D is placed in cooperative relationship at the under surface of the lower bracket support platform 58 at a time when the entire housing assembly is in a raised position with respect to the impact zone which includes the substrate 12 supporting the chip 18. By virtue of this fact, it is necessary to lower the housing or raise the substrate carrier 62 into a position as generally represented by that in FIG. 4. In order that the plurality of alignment pins 96 do not damage the substrate land pattern 16, the plurality of pins are held under a predetermined tension by means of a biasing bar 104, as more clearly shown in FIGS. 6 and 7. The amount of tension which is exerted downwardly by the biasing bar on the alignment pins 94 is adjustable by means of an adjustable spring loaded screw 106 so that the pins are urged upwardly when brought into close proximity to the substrate.

Figure 8:
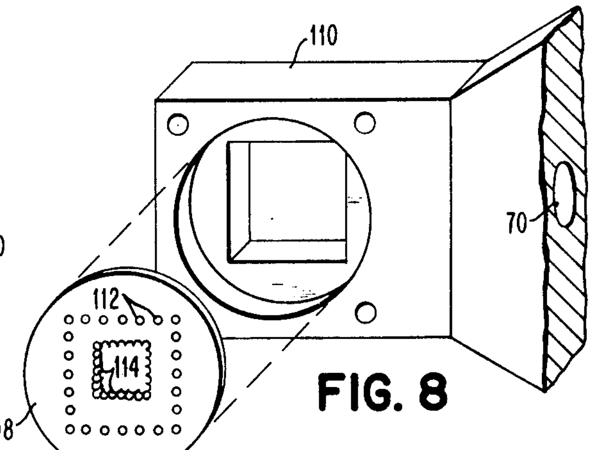
FIG. 8 is a perspective view illustrating another embodiment illustrating a replacable mask or dieplate which may be employed to vary the array of impact surfaces which actually reach the impact zone.

A modified version of the lower bracket support platform is shown in FIG. 8. In this modified version, a replaceable mask 108 is used in conjunction with a lower bracket support platform 110 which possess a slightly different configuration than that previously described. By employing a replaceable mask, different bonding patterns are obtainable by forming a plurality of holes 112 for the outer impact surfaces and a plurality of semicircular holes 114 for the inner impact surfaces. In other words, when it is desired to prevent an impact surface from reaching the impact zone, no hole will be formed in the mask 108. Actually, only one mask 108 has been shown in the alternative embodiment; however, it is readily appreciated that two masks would be necessary if the guide tubes and their respective impact wires were to extend through the mask any appreciable distance when being urged into the impact zone. This is necessary in order to maintain proper alignment as the tubes and wires are extremely thin, and thus flexible.

OPERATION

With reference to the drawings, a more complete description of the operation of the improved thermocompression bonding apparatus now will be made. In one mode of operation, a semiconductor chip is back bonded to the substrate cavity 14. The chip and substrate subassembly is then transferred to the heating substrate carrier or stage 62. The heating substrate carrier is then mechanically moved under control of micrometer adjustments (not shown) until the chip terminals or pads are positioned under the wire ends or impact surfaces 90, as best shown in FIG. 5. The alignment is performed by conventional microscopic alignment techniques which form no part of the present invention. Next, a decal D having a plurality of alignment holes 98 is fitted over a plurality of guide pins 96 on the lower bracket support platform 58. Simultaneously therewith, a source of vacuum is applied to the vacuum tube 66 so as to hold the decal firmly in position.

The heating substrate carrier 62 is then moved a fixed distance towards the lower bracket support platform 58 so as to attain a respective position, as generally shown in FIG. 4.

Next, the plurality of inner chambers pistons 72 disposed in the inner chamber 36 are pneumatically activated to force the decal against the chip and substrate by way of the plurality of inner impact surfaces 90, again more clearly shown in FIG. 5. Immediately thereafter, the outer pistons 72 disposed in the outer chamber 34 are similarly pneumatically activated via a pneumatic source connected to the hose 42 so as to force the outer portion of the decal D against the substrate. The plurality of wires 86, inner and outer chambers, are then forced back into their tubes pneumatically in response to a pneumatic source of power being applied to the tube 50, the chamber 54, and then to the undersurface of the respective pistons 72 via the passage 92. The thermocompression bonding apparatus is then ready to form another bonding operation.

Is is thus seen that the thermocompression bonding apparatus of the present invention provides a plurality of simultaneous thermocompression bonds in a confined area at an extremely rapid speed.

While the invention has been particularly shown and described with reference to the preferred embodiments thereof, it will be understood by those skilled in the art that various changes in form and details may be made therein without departing from the spirit and scope of the invention.

I claim:

1. A thermocompression bonding apparatus for connecting at least one of a plurality of spaced terminals to at least one of a plurality of spaced substrate land patterns via at least one of a plurality of spaced interconnection members, the plurality of spaced interconnection members being affixed to a carrier film comprising:

a. a housing, b. a connector means to said housing for delivering a source of power to said housing, c. a plurality of independently operative piston means, each if said piston means slidably disposed in said housing, each of said piston means having extension means terminating in an impact surface means, the impact surface means being operative for affecting a thermocompression bond, d. a plurality of guide means in said housing, each of said extension means slidably disposed within respective ones of said guide means, and e. wherein a plurality of said impact surface means are independently moved to an impact zone in response to said connection means being connected to a source of power for affecting a thermocompression bond between at least one of a plurality of spaced terminals to at least one of a plurality of spaced substrate land patterns via at least one of a plurality of spaced interconnection located in the impact zone.

2. A thermocompression bonding apparatus for connecting at least one of a plurality of spaced terminals to at least one of a plurality of spaced substrate land patterns via at least one of a plurality of spaced interconnection members, the plurality of spaced interconnection members being affixed to a carrier film as in claim 1, further including:

a. a first and a second chamber disposed in said housing, b. a portion of said plurality of piston means being disposed in said first chamber, and the remainder of said plurality of independent piston means being disposed in said second chamber, and c. said connector means being adapted to supply independent sources of power to said first and to said second chamber.

3. A thermocompression bonding apparatus for connecting at least one of a plurality of spaced terminals to at least one of a plurality of spaced substrate land patterns via at least one of a plurality of spaced interconnection members, the plurality of spaced interconnection members being affixed to a carrier film as in claim 1, wherein:

a. respective ones of said plurality of guide means comprises an elongated tube member.

4. A thermocompression bonding apparatus for connecting at least one of a plurality of spaced terminals to at least one of a plurality of spaced substrate land patterns via at least one of a plurality of spaced interconnection members, the plurality of spaced interconnection members being affixed to a carrier film, as in claim 1 wherein:

a. the carrier film further includes a plurality of registration holes, and further including, b. a plurality of alignment means cooperating with the registration holes on the film carrier;

c. said alignment means being disposed in relationship to said housing so as to align the film carrier in a position between said impact surface means and the impact zone.

5. A thermcompression bonding apparatus for connecting at least one of a plurality of spaced terminals to at least one of a plurality of spaced substrate land patterns via at least one of a plurality of spaced interconnection members, the plurality of spaced interconnection members being affixed to a carrier film, as in claim 4 further including:

a. vacuum means disposed in said housing for holding the film carrier in a fixed position.

6. A thermocompression bonding apparatus for connecting at least one of a plurality of spaced terminals to at least one of a plurality of spaced substrate land patterns via at least one of a plurality of spaced interconnection members, the plurality of spaced interconnection members being affixed to a carrier film as in claim 1 wherein:

a. each of said extension means terminating in an impact surface means comprises thin wires each independently movable within its respective said guide means.